G. B. JENKINSON.
TRUNK CASTER FRAME.
No. 80,548. Patented Aug. 4, 1868.
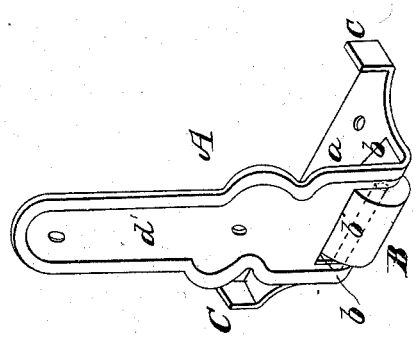
Witnesses:
Jno. Alfred Ellis
J. H. Miller
Inventor:
G. B. Jenkinson
per J. H. Alexander
Atty.

United States Patent Office.

GEORGE B. JENKINSON, OF NEWARK, NEW JERSEY.

Letters Patent No. 80,548, dated August 4, 1868.

IMPROVED TRUNK-CASTER FRAME.

The Schedule referred to in these Letters Patent and making part of the same.

TO ALL WHOM IT MAY CONCERN:

Be it known that I, GEORGE B. JENKINSON, of Newark, in the county of Essex, and State of New Jersey, have invented certain new and useful Improvements in Trunk-Caster Frames; and I do hereby declare that the following is a full, clear, and exact description thereof, reference being had to the accompanying drawing, and to the letters of reference marked thereon, which form a part of this specification, and which represents a view in perspective of my improved trunk-caster frame.

The object of my invention is to provide a simple and convenient caster-frame for trunks, which will enable the caster to be placed in such position upon the trunk that the caster may be rolled either upon its end or bottom, or at an angle, and which will protect the journals of the caster from being broken or forced out of place, and clamp the bottom cleat of the trunk to prevent it from splitting, to which end, my improvements consist in constructing the frame in angular form, having the pin or axle on which the caster rotates secured in diagonal braces at and within the angle thereof, and provided with clamps which embrace the bottom cleat, to prevent the latter from splitting.

In the accompanying drawing, A represents the caster-frame, which is made in angular form, its horizontal portion, $a$, being attached to the bottom cleat of the trunk, and the vertical portion $a'$ to the side. The caster B rotates upon a pin or axle, $b'$, which is secured, by riveting over or otherwise, in the diagonal braces $b$, which are placed within the angle of the frame, affording a bearing for the axle, as well as strengthening the angle. The bottom portion of the frame is provided with clamps, $c$, which extend upwards on each side of the bottom cleat, embracing the same, for the purpose of preventing it from splitting. The braces $b$ rest against the end of the bottom cleat, which is cut out suitably to receive them. It will thus be seen that by means of this arrangement of the axle $b'$ between the frame, bottom cleat, and diagonal braces, it is effectually protected from risk of damage or displacement, while the position of the caster within the angle of the frame enables the trunk to be rolled on the end or bottom, or at an angle, as desired. The clamps $c$ prevent the bottom cleats from splitting, which, from their exposed position, and the rough usage to which trunks are subjected, they are otherwise very liable to do. The caster may be made of brass or malleable iron, but I prefer to make it of struck-up sheet iron, as less liable to be broken.

I do not broadly claim placing the caster at the angle of the frame, as such an arrangement is shown in a device heretofore patented, but in that case the roller is placed without the angle, and entirely unprotected, being constantly liable to be broken off, or to be lost by the axle becoming loose and dropping out, which disadvantages are obviated by the construction and attachment of my frame.

What I claim, and desire to secure by Letters Patent, is—

As a new article of manufacture, the within-described trunk-caster frame, formed with clamps $c$ $c$, braces $b$ $b$, and having the roller placed in the angle of the frame, as and for the purpose set forth.

In testimony that I claim the foregoing as my own, I affix my signature in presence of two witnesses.

GEO. B. JENKINSON.

Witnesses:
PETER HERTEL,
LOUIS CONRADI.